(12) United States Patent
Callahan et al.

(10) Patent No.: US 12,490,347 B2
(45) Date of Patent: Dec. 2, 2025

(54) DEVICES FOR OHMICALLY HEATING A FLUID

(71) Applicant: OhmIQ, Inc., North Charleston, SC (US)

(72) Inventors: Jeremiah M. Callahan, Sullivan's Island, SC (US); Eric J. Doesburg, Charleston, SC (US); Gregory S. Lyon, Mamaroneck, NY (US); Michael J. Wieckowski, Charleston, SC (US); Julie Klions, Charleston, SC (US); Weston Scott Catron, Charleston, SC (US); Kevin James Hammer, Charleston, SC (US); Jesse Flynn, Johns Island, SC (US)

(73) Assignee: OhmIQ, Inc., North Charleston, SC (US)

( * ) Notice: Subject to any disclaimer, the term of this patent is extended or adjusted under 35 U.S.C. 154(b) by 979 days.

(21) Appl. No.: 17/610,090

(22) PCT Filed: May 10, 2019

(86) PCT No.: PCT/US2019/031752
§ 371 (c)(1),
(2) Date: Nov. 9, 2021

(87) PCT Pub. No.: WO2020/231386
PCT Pub. Date: Nov. 19, 2020

(65) Prior Publication Data
US 2022/0268140 A1 Aug. 25, 2022

Related U.S. Application Data

(63) Continuation-in-part of application No. 16/346,354, filed as application No. PCT/US2017/060192 on Nov. 6, 2017, now Pat. No. 11,353,241.
(Continued)

(51) Int. Cl.
*H05B 3/60* (2006.01)
*F24H 1/10* (2022.01)
(Continued)

(52) U.S. Cl.
CPC ............... *H05B 3/60* (2013.01); *F24H 1/106* (2013.01); *F24H 9/1818* (2013.01); *F24H 15/18* (2022.01);
(Continued)

(58) Field of Classification Search
CPC .......... F24H 1/106; F24H 15/18; F24H 15/37; F24H 15/407; F24H 9/1818; H05B 2203/021; H05B 3/60
(Continued)

(56) References Cited

U.S. PATENT DOCUMENTS

| 1,476,080 A | 12/1923 | Kaelin |
| 1,553,491 A | 9/1925 | Arthur |

(Continued)

FOREIGN PATENT DOCUMENTS

| CA | 1291785 C | 11/1991 |
| CH | 671313 A5 | 8/1989 |

(Continued)

OTHER PUBLICATIONS

International Search Report and Written Opinion for PCT/US2017/060192 mailed Feb. 26, 2018.
(Continued)

*Primary Examiner* — Sang Y Paik
(74) *Attorney, Agent, or Firm* — Carter, DeLuca & Farrell LLP

(57) ABSTRACT

A heater for heating a conductive liquid includes a two-dimensional array of rod-like electrodes (22, 122, 322, 422, 522) extending parallel to one another, an electrical power supply having a plurality of poles, and power switches to
(Continued)

connect different ones of the electrodes to different poles so that current flows between the poles through the liquid. The array desirably includes outer electrodes defining the boundary (24, 424) of the array and inner electrodes disposed within this boundary. The array may have regular or irregular spacings between the electrodes. The array can provide numerous different connection schemes to vary the electrical resistance between the poles and thus vary the heating rate. The array can be arranged to provide substantially equal currents through three poles of a three-phase power supply.

17 Claims, 8 Drawing Sheets

Related U.S. Application Data

(60) Provisional application No. 62/418,493, filed on Nov. 7, 2016, provisional application No. 62/458,201, filed on Feb. 13, 2017.

(51) Int. Cl.
*F24H 9/1818* (2022.01)
*F24H 15/18* (2022.01)
*F24H 15/37* (2022.01)
*F24H 15/407* (2022.01)

(52) U.S. Cl.
CPC .......... *F24H 15/37* (2022.01); *F24H 15/407* (2022.01); *H05B 2203/021* (2013.01)

(58) Field of Classification Search
USPC .................................. 392/314–337
See application file for complete search history.

(56) References Cited

U.S. PATENT DOCUMENTS

| | | | |
|---|---|---|---|
| 1,902,842 A | 3/1933 | Eaton | |
| 1,950,511 A | 3/1934 | Noll | |
| 2,748,253 A | 5/1956 | Bremer | |
| 3,796,857 A | 3/1974 | Henley et al. | |
| 3,867,610 A | 2/1975 | Quaintance | |
| 3,925,638 A | 12/1975 | Scatoloni | |
| 4,107,024 A * | 8/1978 | Fukuzuka | C02F 1/46109 |
| | | | 204/280 |
| 4,417,132 A | 11/1983 | Simpson | |
| 4,418,269 A | 11/1983 | Eaton-Williams | |
| 4,730,098 A | 3/1988 | Cave | |
| 4,953,536 A | 9/1990 | Israelsohn et al. | |
| 6,080,971 A | 6/2000 | Seitz et al. | |
| 6,522,834 B1 | 2/2003 | Herrick et al. | |
| 6,640,048 B2 | 10/2003 | Novotny et al. | |
| 6,849,178 B2 | 2/2005 | Hecking | |
| 7,050,706 B2 | 5/2006 | Israelsohn et al. | |
| 7,190,886 B2 | 3/2007 | Dubicki et al. | |
| 7,403,701 B2 | 7/2008 | Choi et al. | |
| 7,742,689 B2 | 6/2010 | Harrison et al. | |
| 7,817,906 B2 | 10/2010 | Callahan et al. | |
| 7,903,956 B2 | 3/2011 | Colburn et al. | |
| 8,532,474 B2 | 9/2013 | Campbell | |
| 8,565,588 B2 | 10/2013 | Bierbaumer et al. | |
| 8,649,670 B2 | 2/2014 | Lu et al. | |
| 8,861,943 B2 | 10/2014 | Bowers et al. | |
| 9,423,151 B2 | 8/2016 | Kacar et al. | |
| 9,644,499 B2 | 5/2017 | Byrd | |
| 10,281,138 B2 | 5/2019 | Mahoney | |
| 10,365,013 B1 | 7/2019 | Wieckowski et al. | |
| 2004/0004005 A1* | 1/2004 | Sheldon | C25B 1/04 |
| | | | 205/630 |
| 2006/0291527 A1 | 12/2006 | Callahan et al. | |
| 2006/0291822 A1 | 12/2006 | Sheldon | |
| 2007/0154193 A1 | 7/2007 | Harrison et al. | |
| 2007/0266702 A1 | 11/2007 | Cotton | |
| 2009/0242424 A1* | 10/2009 | Behr | C02F 1/4672 |
| | | | 205/757 |
| 2010/0170889 A1 | 7/2010 | Keite-Telgenbuscher et al. | |
| 2010/0296800 A1 | 11/2010 | Min et al. | |
| 2010/0322605 A1 | 12/2010 | van Aken et al. | |
| 2011/0272392 A1 | 11/2011 | Dohring et al. | |
| 2015/0316253 A1* | 11/2015 | Ilin | H05B 3/03 |
| | | | 392/338 |
| 2016/0288620 A1 | 10/2016 | Pierron et al. | |
| 2016/0291527 A1 | 10/2016 | Hashimoto et al. | |

FOREIGN PATENT DOCUMENTS

| | | |
|---|---|---|
| CN | 1918439 A | 2/2007 |
| CN | 101443620 A | 5/2009 |
| CN | 101970947 A | 2/2011 |
| CN | 102171516 A | 8/2011 |
| CN | 103477158 A | 12/2013 |
| CN | 105191488 A | 12/2015 |
| CN | 105899888 A | 8/2016 |
| DE | 10000101 A1 | 8/2001 |
| EP | 0349689 A1 | 1/1990 |
| JP | S56-118326 U | 9/1981 |
| JP | 859128221 A | 7/1984 |
| JP | 2000340338 A | 12/2000 |
| JP | 2011511910 A | 4/2011 |
| JP | 2011511919 A | 4/2011 |
| JP | 2017-076555 A | 4/2017 |
| KR | 10-2008-0017018 A | 2/2008 |
| KR | 10-2014-0016264 A | 2/2014 |
| WO | 2005066551 A1 | 7/2005 |
| WO | 2006119440 A2 | 11/2006 |
| WO | 2009100486 A1 | 8/2009 |
| WO | 2011148404 A1 | 12/2011 |
| WO | 2012092641 A1 | 7/2012 |
| WO | 2012105864 A1 | 8/2012 |
| WO | 2018/015780 A1 | 1/2018 |
| WO | 2018085773 A1 | 5/2018 |

OTHER PUBLICATIONS

Partial International Search Report for Application No. PCT/US2019/031752 mailed Feb. 5, 2020, 7 pages.

International Search Report including the Written Opinion from Application No. PCT/US2019/031752 mailed Apr. 17, 2020, 18 pages.

Extended European Search Report with Written Opinion for Application No. 20177797.6 dated Sep. 21, 2020, 9 bages.

Chinese Search Report for Application No. 201780078688.7, dated Jan. 5, 2021, 3 pages.

Search Report by Registered Searching Organization for JP2019545718 issued Feb. 24, 2021; 10 pages.

Chinese Office Action issued in corresponding application 201980097717.3, mailed Feb. 25, 2025, together with English language translation.

Chinese Search Report for CN Appl. No. 201980097717.3, dated Jun. 3, 2024, 2 p. [See p. 1, categorizing the cited references].

\* cited by examiner

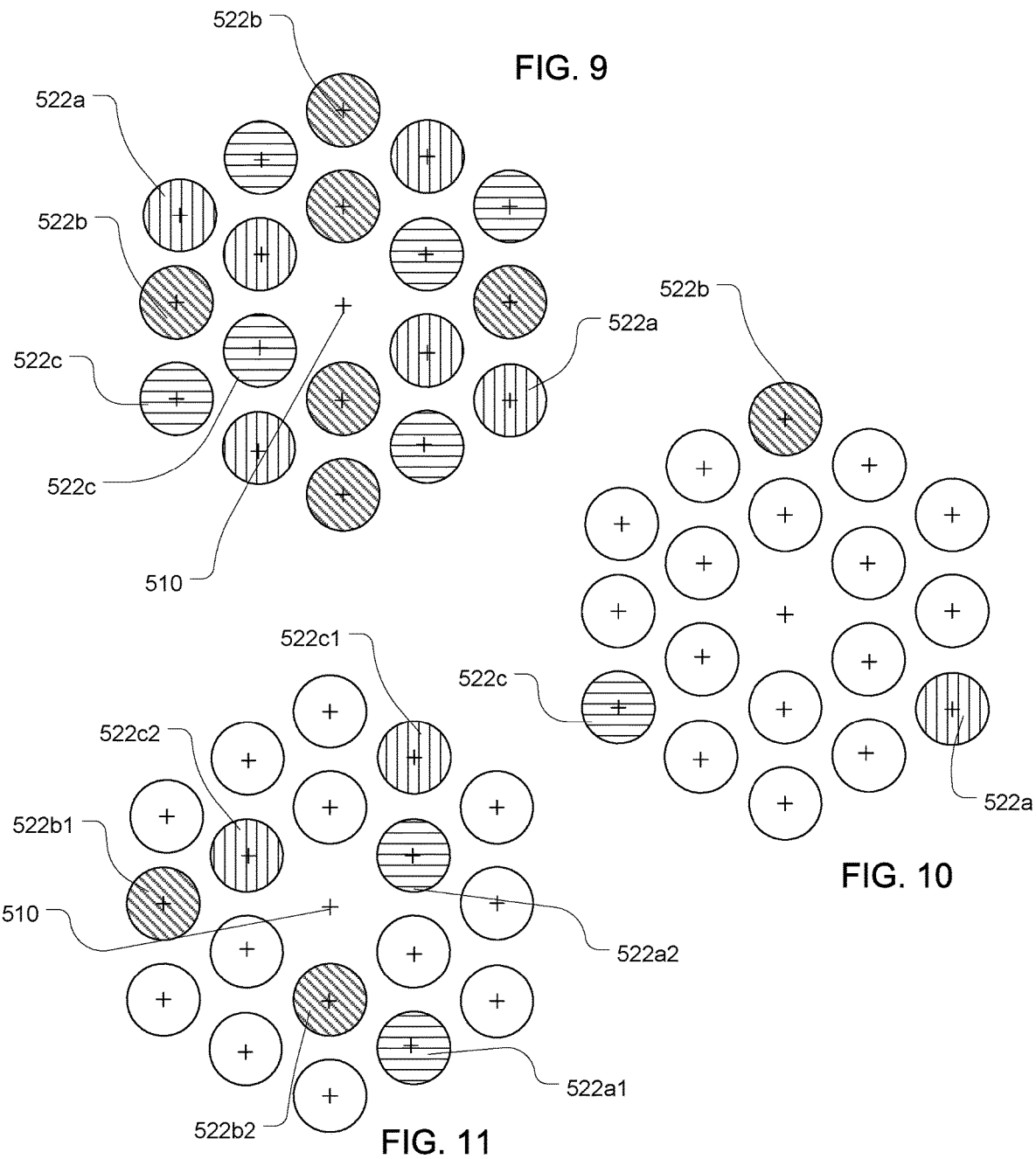

FIG. 12
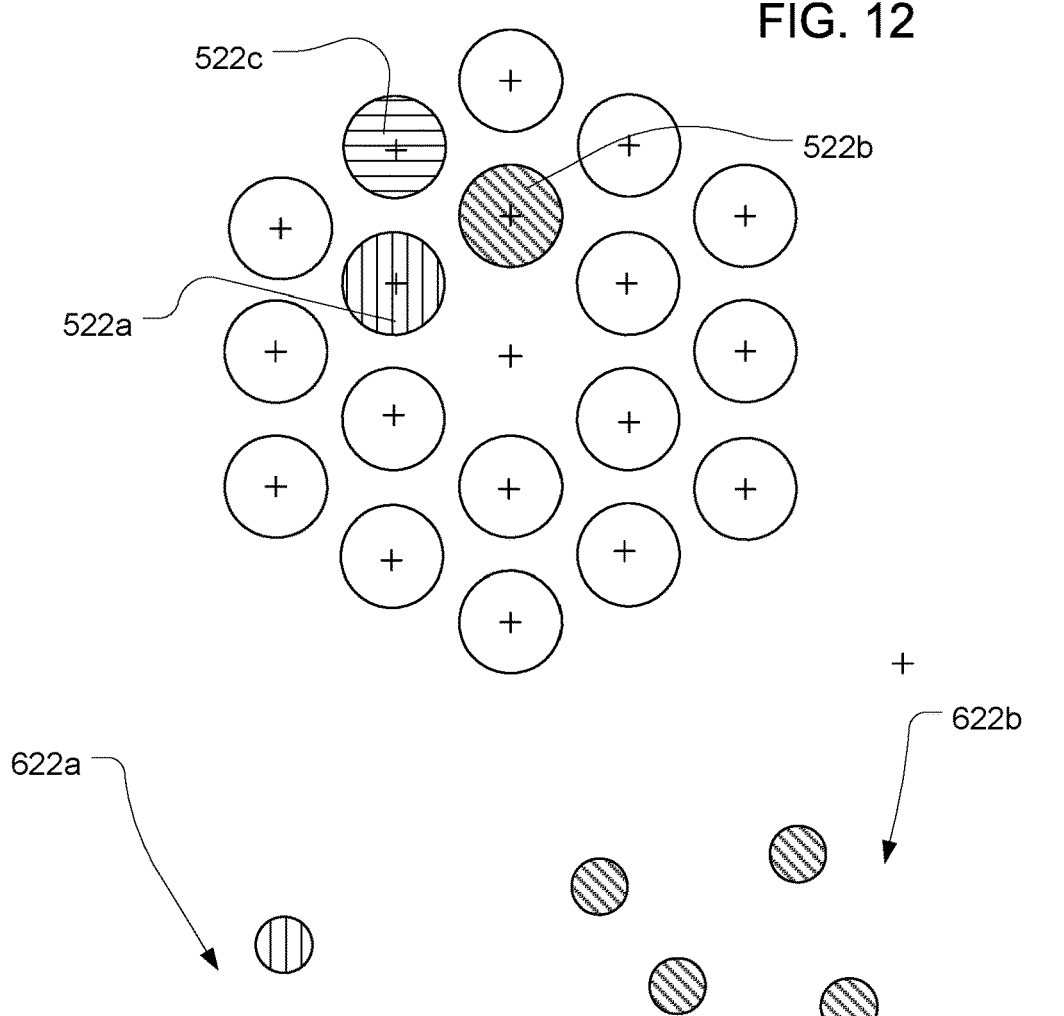
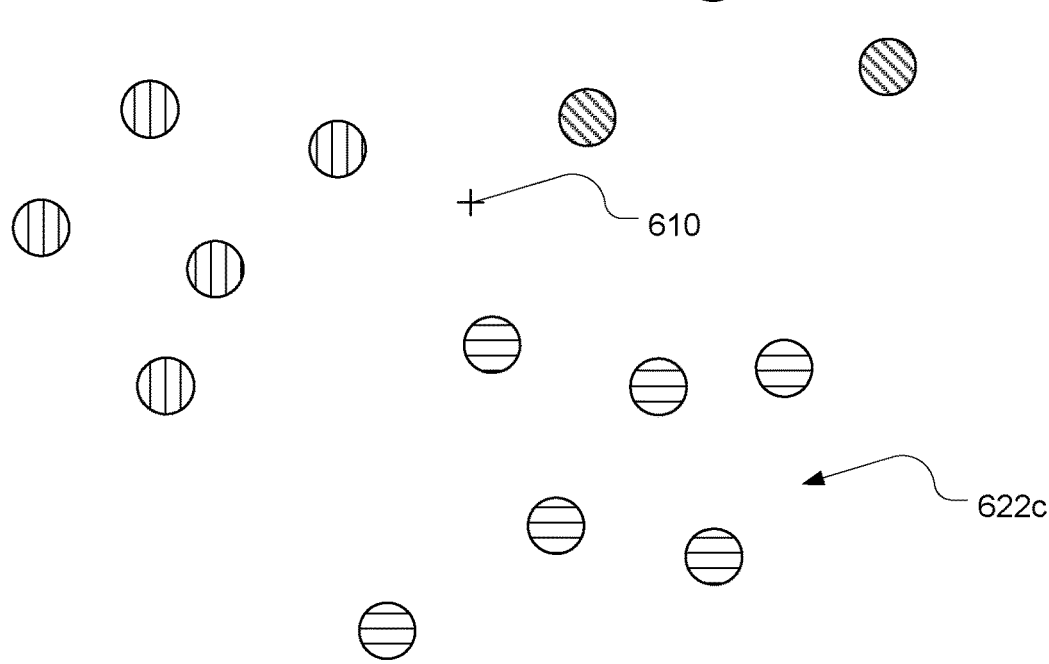
FIG. 13

DEVICES FOR OHMICALLY HEATING A FLUID

CROSS-REFERENCE TO RELATED APPLICATIONS

The present application is a national phase entry under 35 U.S.C. § 371 of International Application No. PCT/US2019/031752, filed on May 10, 2019, which is a continuation-in-part of U.S. patent application Ser. No. 16/346,354, filed Apr. 30, 2019, which is the national stage of PCT International Application No. PCT/US2017/060192, filed on Nov. 6, 2017, which in turn claims the benefit of the filing date of U.S. Provisional Patent Application No. 62/458,201 filed on Feb. 13, 2017 and claims the benefit of U.S. Provisional Application No. 62/418,493 filed on Nov. 7, 2016, the disclosures of which are hereby incorporated by reference herein.

BACKGROUND OF THE INVENTION

The present disclosure relates to ohmic fluid heating devices, and methods of heating a fluid. An ohmic fluid heater can be used to heat an electrically conductive fluid as, for example, potable water. Such a heater typically includes plural electrodes spaced apart from one another. The electrodes are contacted with the fluid to be heated so that the fluid fills the spaces between neighboring electrodes. Two or more of the electrodes are connected to a power supply so that different electrical potentials are applied to different ones of the electrodes. For example, where an ohmic heater is operated using normal AC utility power such as that obtainable from a household electric plug, at least one of the electrodes is connected to one pole carrying an alternating potential, whereas at least one other electrode is connected to the opposite pole carrying a neutral or ground pole. Electricity passes between the electrodes through the fluid at least one space between the electrodes, and electrical energy is converted to heat by the electrical resistance of the fluid.

It is desirable to control the rate at which electrical energy is converted to heat, (the "heating rate"), in such a heater to achieve the desired temperature of the heated fluid. It has been proposed to vary the heating rate by mechanically moving electrodes closer relative to one another, thereby varying the electrical resistance between the electrodes. Such arrangements, however, require complex mechanical elements including moving parts exposed to the fluid. Moreover, it is difficult to make such mechanisms respond quickly to deal with rapidly changing conditions. For example, if an ohmic heater is used in an "instantaneous heating" arrangement to heat water supplied to a plumbing fixture such as a shower head, the water continually passes through the heater directly to the fixture while the fixture is in use. If the user suddenly increases the flow rate of the water, as by opening a valve on the fixture, the heater should react rapidly to increase the heating rate so as to maintain the water supplied to the fixture at a substantially constant temperature.

It has also been proposed to provide an ohmic heater with a substantial number of electrodes and with power switches to selectively connect different ones of the electrodes to the poles of the power supply. For example, an array of electrodes may be disposed in a linear arrangement with spaces between the electrodes. The array includes two electrodes at the extremes of the array and numerous intermediate electrodes between the two extreme electrodes. To provide a minimum heating rate, the extreme electrodes are connected to opposite poles of the power supply, and the intermediate electrodes are isolated from the poles. The electric current passes from one extreme electrode through the fluid in a first space to the nearest one of the intermediate electrodes, then through fluid in the next space to the next isolated electrode and so on until it reaches the last intermediate electrode, and flows from the last intermediate electrode to the other extreme electrode. Thus, the fluid within all of the spaces is electrically connected in series between the two extreme electrodes. This connection scheme provides high electrical resistance between the poles of the power supply and a low heating rate.

For a maximum heating rate, all of the electrodes are connected to the poles so that each electrode is connected to the opposite pole from its next nearest neighbors. Stated another way, alternate ones of the electrodes are connected to the hot pole and to the neutral pole. In this condition, the fluid in each space is directly connected between the poles of the power supply, in parallel with the fluid in every other space. The connection scheme provides minimum resistance between the poles. Intermediate heating rates may be achieved by connecting various combinations of electrodes to the poles of the power supply. For example, in one such connection scheme, two of the intermediate electrodes are connected to opposite poles of the power supply, and the remaining electrodes are electrically isolated from the poles of the power supply. The connected intermediate electrodes are separated from one another by a few other intermediate electrodes and a few spaces, so that fluid in only a few spaces is connected in series between the poles. This connection scheme provides a resistance between the poles that is higher than the resistance in the maximum heating rate scheme, but lower resistance than the resistance in the minimum heating rate scheme. With fluid having a given conductivity, different connection schemes will provide different resistances between the poles, and thus different heating rates. Because the resistance with a given connection scheme decreases as the conductivity increases, a parameter referred to herein as "specific resistance" is used in this disclosure to characterize a circuit or a part of a circuit having elements electrically connected by a fluid. The specific resistance is the ratio between the electrical resistance of the circuit or part of a circuit and the resistivity of the fluid in the circuit.

Typically, the switches are electrically controllable switches such as semiconductor switching elements as, for example, thyristors. Ohmic heaters of this type can switch rapidly between connection schemes and thus switch rapidly between heating rates. Such heaters do not require any moving parts in contact with the fluid to control the heating rate. However, ohmic heaters of this type can only select from among the set of the specific resistances fixed by the physical configuration of the electrodes, and thus the heating rate, in steps. Under certain conditions, the available heating rates may not match the heating rate which produces the desired fluid temperature. This drawback can be more significant for those heaters which are used in a range of different conditions such as fluids of widely differing conductivities, different flow rates of fluid flowing through the heater at different rates; different fluid inlet temperatures and different fluid outlet temperatures. For example, if the heater provides a set of different specific resistances between a highest specific resistance usable to provide a low heating rate with a fluid of relatively high conductivity and a lowest specific resistance usable to provide a high heating rate with a fluid of low conductivity, only a small subset of the available specific resistances will be within a range useful to regulate the temperature of a particular fluid. Adding more electrodes increases the cost of and size of the heater. Moreover, additional electrodes can produce redundant connection schemes such that different ones of the connection schemes provide the same specific resistance between the poles of the power supply, in which case the additional electrodes offer little benefit.

One solution to this problem is disclosed in U.S. Pat. Nos. 7,817,906 and 8,861,943, the disclosures of which are hereby incorporated by reference herein. As disclosed in these patents, providing electrodes in an arrangement with non-uniform specific resistances between pairs of neighboring electrodes as, for example, providing electrodes at non-uniform spacings can provide an ohmic heater suitable for operation under a wide range of conditions. Desirably, the specific resistances between pairs of neighboring electrodes are selected so that, for a fluid of a given conductivity, the power levels available using different connection schemes include a series of non-redundant specific resistances extending over a very wide range. For example, such a heater may provide 60 or more specific resistances in a substantially logarithmic series, i.e., a series of specific resistances such that a ratio between each specific resistance and the next lower specific resistance is substantially constant. Such an arrangement provides a useful solution which has been employed commercially in demanding applications as, for example, an instantaneous heater for domestic hot water.

However, still further improvement would be desirable. For example, the commercial implementations of heaters as disclosed in the aforementioned '706 and '943 patents have used electrodes in the form of electrically-conductive plates which are disposed in a dielectric housing so that the plates subdivide the interior of the housing into channels. The housing includes passages which direct the fluid through these channels. While this arrangement works well for mass-produced heaters of modest size as, for example, domestic water heaters for private homes or individual apartments, it is not optimum for large-scale industrial and commercial heaters. Such heaters typically are built to order in a custom size to fit the application. The cost of designing and fabricating the complex dielectric housing to suit the particular arrangement of electrodes required for a customized arrangement can be significant. Moreover, the components can be damaged if subjected to conditions such as extreme pressures and temperatures which may be encountered in industrial and commercial heaters, and may be difficult to repair or replace.

BRIEF DESCRIPTION OF THE DRAWINGS

FIGS. 9, 10, 11 and 12 are diagrammatic views depicting certain connection patterns used in operation of the heater of FIG. 8.

FIG. 13 is a diagrammatic view of an electrode array in a heater according to a further embodiment of the invention.

DETAILED DESCRIPTION

Figure 1:
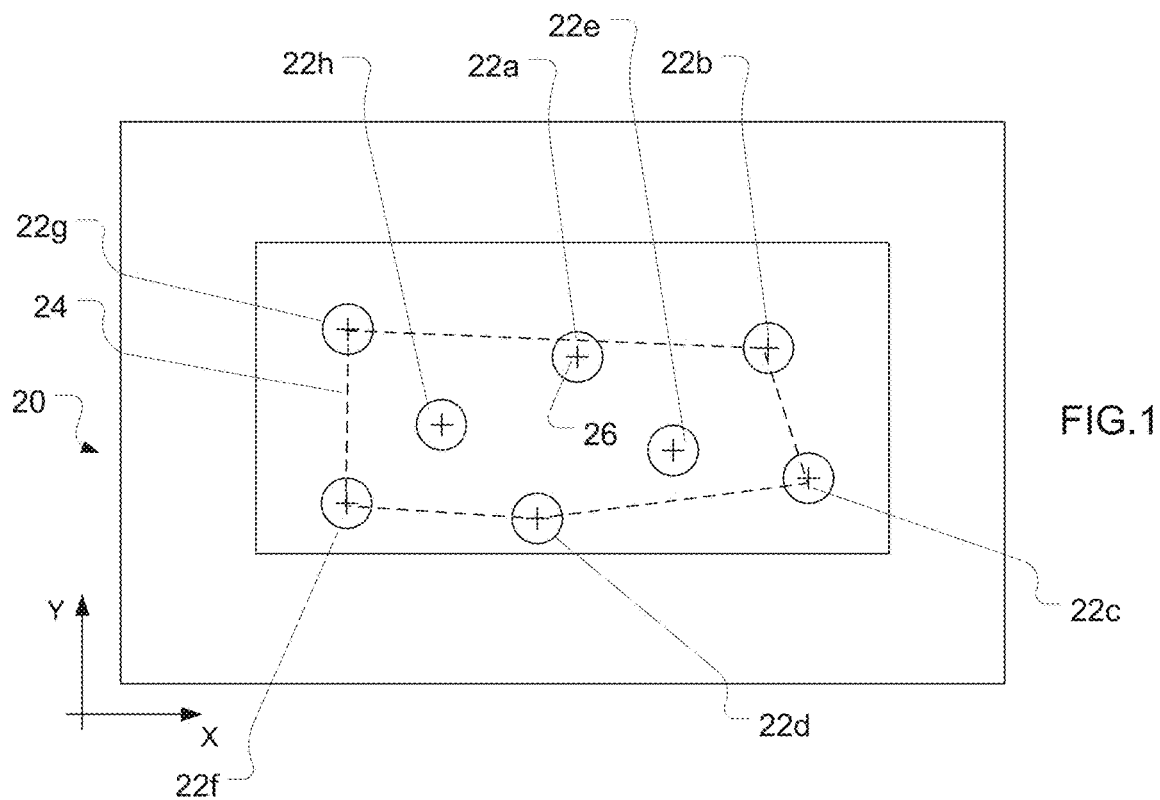
FIG. 1 is a diagrammatic sectional view of a heater according to one embodiment of the invention.

A heater according to one embodiment of the invention includes a housing 20 and numerous rod-like electrodes extending within the housing in the plane of the drawing. These electrodes are disposed in an irregular two-dimensional array. As depicted in FIG. 1, the electrodes are circular cylinders and thus are circular as seen in cross-section in FIG. 1. In the irregular array, each of the electrodes has multiple neighboring electrodes. For example, electrodes 22a, 22b, 22c, and 22d are all neighbors of electrode 22e. Unless otherwise specified, the location of a rod-like or cylindrical electrode as used herein refers to the location of the axis of the electrode. Electrodes 22b, 22c, 22d, 22f and 22g are "outer electrodes" as referred to herein in that they cooperatively define the outer boundary 24 of the array. As referred to in this disclosure, the outer boundary 24 of the array is the polygon formed by the shortest possible combination of imaginary straight lines extending in a plane perpendicular to the axes 26 of some of the electrodes 22 between the axes such the axes of all of the electrodes are either within or on the outer boundary. By contrast, electrodes 22e, 22a and 22h are inner electrodes as referred to herein because their axes 26 lie within, but not on, the boundary 24.

In the irregular array of FIG. 1, the electrodes lie at numerous different distances from one another. The array of FIG. 1 is irregular in two dimensions, in that the spacing between axes of the electrodes in both of the directions perpendicular to the axes of the electrodes, indicated by arrows X and Y in FIG. 1.

Figure 2:
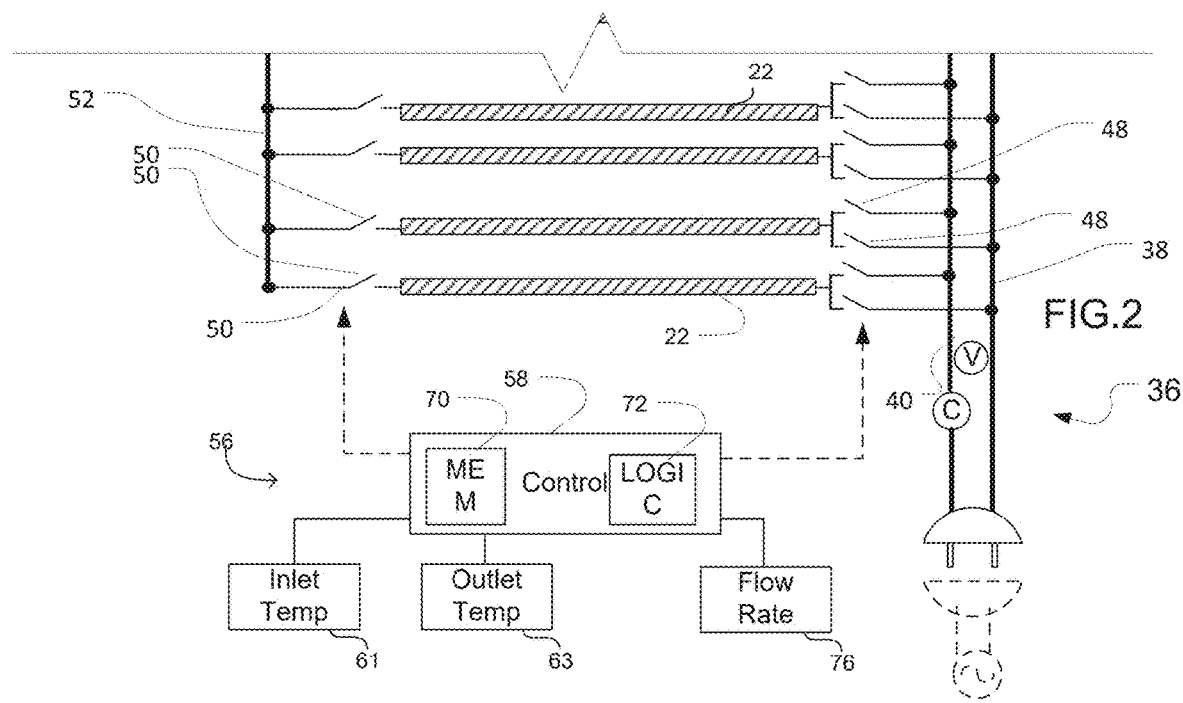
FIG. 2 is schematic view of an electrical circuit in the heater of FIG. 1.

The heater includes an electrical circuit (FIG. 2). The circuit includes a power supply 36 incorporating two poles in the form of conductors 38 and 40. These conductors are connected to source of electrical power such as utility power mains. The conductors are arranged so that in operation different electrical potentials are applied to poles 38 and 40. For example, conductor 40 may be a neutral conductor which receives a neutral voltage, typically close to ground voltage, whereas conductor 38 may be a "hot conductor" which will receive an alternating voltage supplied by the utility power mains. This particular power supply is a single phase power supply in that only one alternating voltage is employed. Power switches 48 are connected between the electrodes 22 and power source 36. The power switches 48 are arranged so that each electrode may be connected to either one of poles 38 and 40 or may be left isolated from the poles. As used in this disclosure, the term "switch" includes mechanical switches which may be manually actuated or actuated by devices such as relays or the like, and also includes solid state devices that can be actuated to switch between a non-conducting condition with very high impedance and a conducting condition with very low impedance. Examples of solid state switches include elements such as triacs, MOSFETs, thyristors, and IGBTs. In the particular arrangement depicted, two individual single pole switches are associated with each electrode 22, each switch being operable to connect the associated electrode with a different one of the poles and the electrode is isolated from both poles when both switches are open. However, this arrangement can be replaced by any other electrically equivalent switching arrangement.

In operation, an electrically conductive fluid as, for example, a conductive liquid such as potable water is passed through the housing 20 so that the fluid fills the space within the housing and contacts the surfaces of electrodes 22. One or more of the electrodes 22 are connected to the hot pole 38 by power switches 48, whereas one or more of the electrodes 22 are connected to the neutral pole 40 so that current flows between the different poles through the fluid contained in the housing. The current flow varies inversely with the resistance between the poles. The resistance between the poles depends on the specific resistances of all of the current paths through the fluid between pairs of the electrodes connected to different poles, conducting in parallel with one another. Moreover, in this arrangement, there are conductive paths through the fluid between a given one of the electrodes and every other one of the electrodes. For example, if only electrodes 26c and 22g are connected to opposite poles, current will flow between these electrodes. Because other electrodes, such as electrodes 22e and 22h are disposed in the path of the flowing current, and these electrodes are electrically conductive, some of the current will pass through the these electrodes, and the specific resistance of the current path between electrodes 22c and 22b will differ appreciably from a hypothetical system in which electrodes 22e and 22h were absent. If only neighboring electrodes 22c and 22b are connected to opposite poles, current will flow between these electrodes. The current flows through all of the fluid in the chamber, but the predominant flow path of this flow lies near the straight line connecting the two electrodes. Thus, the presence of other electrodes, such as electrode 26e, will affect the current flow to some extent, but this effect is small in comparison to the effect of electrodes 22e and 22h in the preceding example. Because the distances through the fluid between different ones of the electrodes differ from one another, and because the effect of other electrodes is different, the specific resistances between different pairs of two electrodes differ from one another. In this regard, the interior electrodes help to provide a wide range of specific resistances between poles 38 and 40 which can be formed by connecting different electrodes to the poles, so that the heater can provide a wide range of heating rates and a large number of distinct heating rates within this range. This wide range of heating rates can be provided in a compact unit. In particular, the assembly may be compact in the dimensions transverse to the axes of the electrodes. This is particularly desirable where the liquid to be heated is under pressure so that the housing holding the electrodes must be a pressure vessel. The cost and weight of the walls of a pressure vessel required to withstand a given pressure increase as the cross-sectional dimensions of the vessel increase.

The heater discussed above further includes an optional control circuit 56 (FIG. 2). Although a particular control circuit is shown and discussed herein, it should be understood that the heater can be controlled by manually controlling the switches and the control circuit may be omitted. The particular control circuit of 56 includes a control processing unit 58 and one or more sensors for sensing the one or more operating parameters of the heater. In one example, the one or more sensors may include only an outlet temperature sensor (not shown) which is physically mounted in or near the outlet of housing 20 to detect the temperature of fluid discharged from the heater. The temperature sensor may include conventional elements as, for example, one or more thermocouples, thermistors and resistance elements having electrical resistance which varies with temperature. The control processing unit 58 is linked to power switches 48 so that the control processing unit can actuate the switches to provide various connection schemes as discussed. The control processing unit may include a memory 70 such as a non-volatile memory, random access memory or other conventional storage element. The memory desirably stores data for least some of the various connection schemes attainable by operation of the switches. The data in the table for each connection scheme may include the settings for each of the power switches 48 to form a particular connection scheme, as well as data specifying, either explicitly or implicitly, a ranking of the stored connection schemes in order of their specific resistances. For example, the data for each connection scheme may include the specific resistance between the poles for that connection scheme, or equivalent data such as values of resistance or conductivity for the various connection schemes all measured or calculated for the case where the spaces are filled with a fluid of a given conductivity. Alternatively, the explicit data may be simply an ordinal number for each connection scheme. In an example of an implicit ranking, the data specifying switch settings for each connection scheme may be stored at addresses within the memory, such that the data at a lowest address specifies the switch settings for a connection scheme with the lowest specific resistance, the data at the next lowest address specifies the data for the connection scheme with the next lowest specific resistance, and so on.

Control processing unit 58 further includes a logic unit 72 connected to memory 70. The logic unit has one or more outputs connected to the power switches 48 as, for example, by conventional driver circuits (not shown) arranged to translate signals supplied by the logic unit to appropriate voltages or currents to actuate the switches. The logic unit may include a general-purpose processor programmed to perform the operations discussed herein, a hard-wired logic circuit, a programmable gate array, or any other logic element capable of performing the operations discussed herein. Although the term "unit" is used herein, this does not require that the elements constituting the unit be disposed in a single location. For example, parts of the control processing unit, or parts of the logic unit, may be disposed at physically separate locations, and may be operatively connected to one another through any communications medium.

In operation, the control unit may start the heater in operation by retrieving the switch setting data for the connection scheme with the highest specific resistance (lowest heating rate) and setting the switches accordingly, so that this connection scheme is set as the first connection scheme in use. After startup, the control unit periodically compares the outlet temperature of the fluid, as determined by the outlet temperature sensor, with a setpoint temperature. If the outlet temperature is below a setpoint temperature by more than a predetermined tolerance, the control unit retrieves the switch setting data for a connection scheme having specific resistance one step lower than the connection scheme then in use to provide a greater heating rate, and sets the switches accordingly. This process is repeated cyclically until the outlet temperature reaches the setpoint. If the outlet temperature exceeds the setpoint by more than the tolerance, the control unit selects a connection scheme with a specific resistance one step higher on the next cycle so as to reduce the heating rate. In this way, the control circuit will ultimately settle at a heating rate which brings the fluid to the desired output temperature. Desirably, the control system actuates the switches to change the control scheme at times when the alternating voltage applied to the hot pole 38 of the power supply is at or near zero. Such zero crossing times occur twice during each cycle of a conventional AC waveform. This arrangement minimizes switching transients and electrical noise generation. In other embodiments, the control logic may use measured current flow between the poles and measured flow rate of the liquid to determine a predicted temperature rise within the heater, and add the predicted temperature rise to a measured inlet temperature of liquid entering the heater to arrive at a predicted outlet temperature. If the predicted outlet temperature is below the setpoint temperature by more than the tolerance, the control logic switches to a connection scheme having a lower specific resistance to increase the current flow. The control logic takes the reverse action if the predicted outlet temperature is above the setpoint temperature.

The electrical circuit of the heater may optionally include one or more shunting busses 52 and shunting switches 50 operable to connect each electrode to the shunting bus or busses and to disconnect each electrode from the shunting bus or busses. Each shunting bus can be used to establish a low resistance conductive path between any two electrodes which are not connected to the poles. In the example above where only electrodes 22c and 22g are connected to opposite poles of the power supply and the other electrodes are disconnected from the poles of the power supply and also are disconnected from the shunting bus, the specific resistance of the current path is relatively high. However, if electrodes 22h and 22e are both connected to the shunting bus, the conductive path will be a composite of two paths in parallel, i.e., a first path from electrode 22c directly to the electrode 22g as discussed above, and a second path from electrode 22c to electrode 22e, through the shunting bus to electrode 22h and from electrode 22h to electrode 22g. Because the shunting switches 50 and shunting bus 52 have very low impedance, the path through electrodes 22e and 22h and the shunting bus will predominate. In this instance, the specific resistance between electrodes 22c and 22g will be much lower. Where the shunting bus is included, it provides additional connection schemes having further different specific resistances. These additional connection schemes in are included in the data specifying the various connection schemes and the specific resistances of the various connection schemes stored in the memory 70 of the control unit 56, and the control unit is linked to the shunting switches 52 so that the control unit can open and close the shunting switches as needed.

Figure 4:
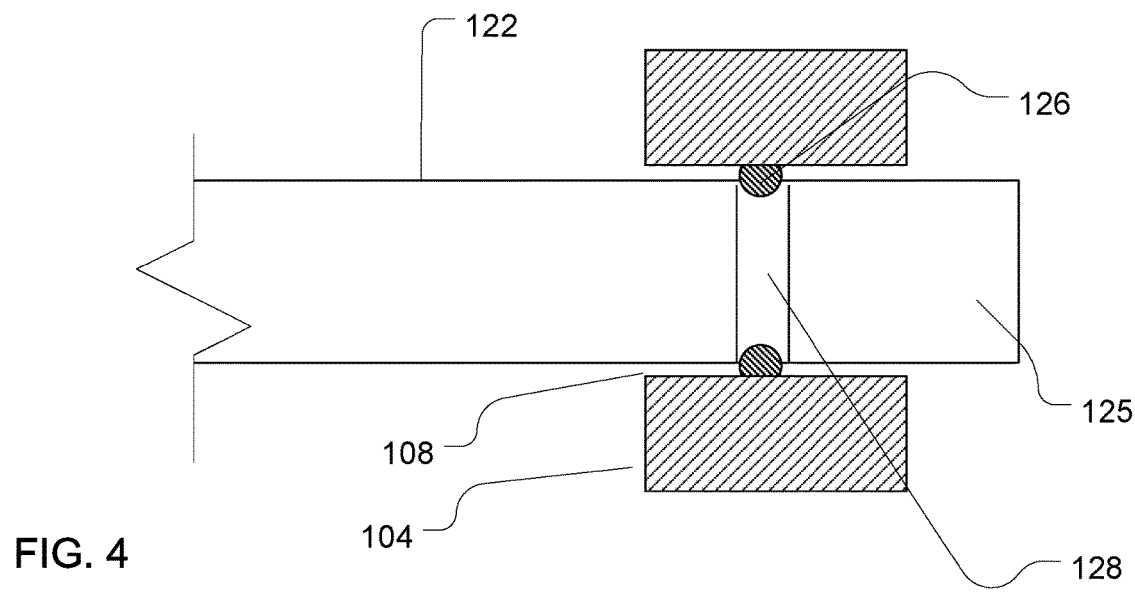
FIG. 4 is a fragmentary sectional view along line 4-4 in FIG. 3.
Figure 3:
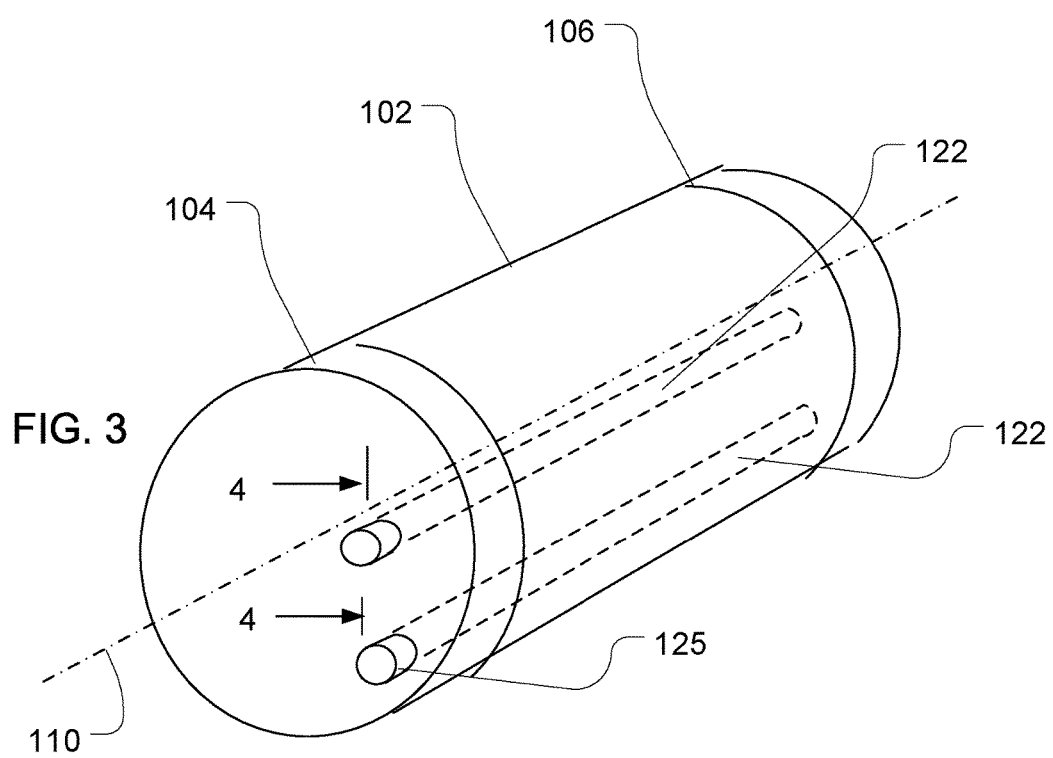
FIG. 3. is a diagrammatic perspective view of a heater according to a further embodiment of the invention.

The rod-like electrodes greatly simplify construction of the heater. For example, as seen in FIG. 3, the housing may be an elongated hollow body 102 having a pair of end walls 104 and 106. Cylindrical electrodes 122 extend through holes 108 (FIG. 4) in end wall 104. Although only two electrodes 122 are depicted in FIG. 3 for clarity of illustration, in practice the electrode array desirably includes numerous electrodes extending parallel with one another and parallel to the axis of elongation 110 of body 102. The electrodes may be positioned in any desired array simply by forming the holes 108 in the desired configuration, which facilitates customization of the heater for a particular application. There is no need for elaborate baffle systems to route the fluid through separate passageways between the electrodes. The end walls of the hollow body may be formed from a dielectric material such as a polymer, or else may be formed from a conductive material such as a metal and equipped with dielectric sleeves (not shown) within holes 108. The exposed ends 125 of the electrodes can be readily connected to the electrical circuit. The individual electrodes passing through the end wall can be secured in place and sealed to the end wall by any of the well-known techniques commonly used to secure elements such as tubes passing through a wall. For example, a seal may be formed by an O-ring 126 seated in a groove 128 on the electrode, and may be secured in place by screw threads (not shown) on the electrode engaged with corresponding screw threads (not shown) in holes 108. The electrodes can be readily removed and serviced or replaced as needed. An inlet (now shown) and an outlet (not shown) are provided in opposite ends walls 104 and 106 to pass fluid through the interior of the heater.

Figure 5:
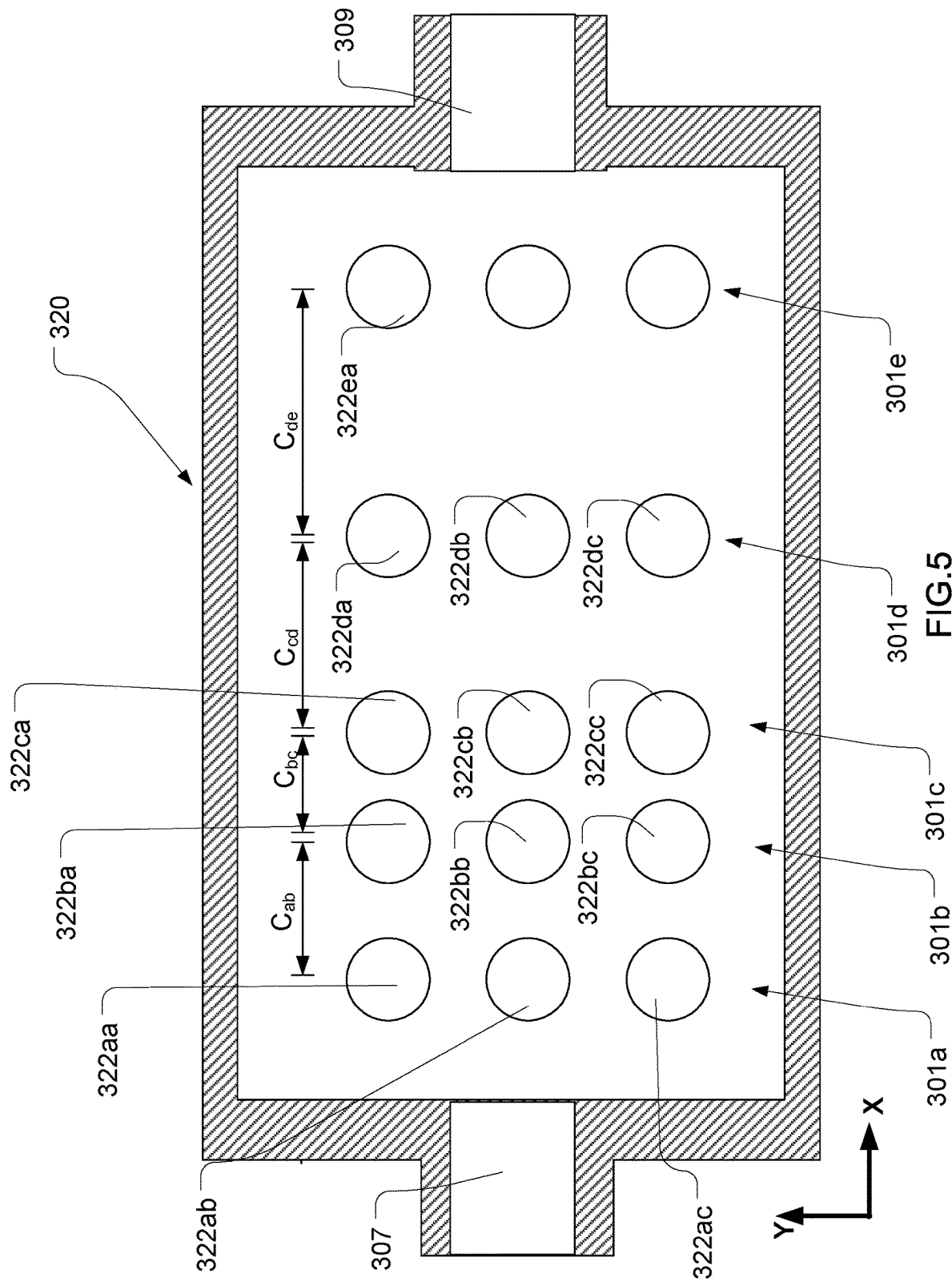
FIG. 5 is a diagrammatic sectional view of a heater according to another embodiment of the invention.

A heater according to a further embodiment of the invention also includes an array of rod-like electrodes 322 extending parallel to one another, in the directions into and out of the plane of the drawing as seen in FIG. 5. In this embodiment, the array is partially regular and partially irregular. The electrodes are disposed in columns 301 extending in the direction denoted by arrow "Y" and in rows extending in the direction denoted by arrow "X", perpendicular to direction Y, both of these directions being perpendicular to the axes of the electrodes. For example, electrodes 322aa, 322ab, and 322ac constitute column 301a, whereas electrodes 322aa, 322ba, 322ca, 322da and 322ea constitute row 303a. The electrodes within each row are disposed at the same location in the Y direction. The electrodes are regularly spaced from one another in the Y direction, so that the distances in the Y direction between adjacent rows 303 are equal. The electrodes within each column are disposed at the same location in the X direction. However, the distances C between mutually-adjacent columns are unequal to one another, so that the columns are irregularly spaced from one another in the X direction. For example, distance $C_{ab}$ between columns 301a and 301b is larger than distance $C_{bc}$ between columns 301b and 301c. In the array of FIG. 5, those electrodes which are disposed in the outer columns 301a and 301e, and those electrodes disposed in outer rows 301a and 301c constitute the outer electrodes and define the boundary of the array, whereas those electrodes which are disposed neither in an outer row nor in an outer column (electrodes 322bb, 322cb and 322db) constitute the inner electrodes disposed within the boundary.

The array of FIG. 5 is disposed in a housing 320 having dielectric walls. In the particular embodiment depicted, the housing is arranged so that liquid passing through the heater flows predominantly in a direction transverse to the axes of the electrodes, in this case the X direction, through the array from inlet 307 to an outlet 309. Here again, no complex structure is required to route the fluid through individual spaces of the array. Alternatively, the flow may be directed generally in directions parallel to the axes of the electrodes.

The electrodes 322 an connected to a power supply similar to that discussed above, so that each electrode can be connected to one or the other pole of the power supply, or may be left disconnected. Where the power supply includes a shunting bus as discussed above, the power supply can connect two or more of the electrodes which are disconnected from the poles to the shunting bus as discussed above. An array of this type can provide numerous combinations of current paths which provide numerous different specific resistances between the poles of the power supply.

In a variant of the array discussed above with reference to FIG. 5, some or even all of the spacings between columns may be equal to one another. In the extreme case where all of the spacings C are identical, the array is a completely regular array. However, even in this case a substantial number of conduction schemes having different specific resistances can be provided. As discussed above in connection with the heater of FIG. 1, the specific resistance between a given pair of electrodes connected to different poles of the power supply will be affected by other electrodes, and this effect varies with the location of the other electrodes relative to the pair of connected electrodes. This effect increases the number of different conduction schemes which can be provided by the array. For example, in the array of FIG. 5, the specific resistance between electrodes 322*aa* and 322*ab* will differ from the specific resistance between electrodes 322*ba* and 322*bb*. The latter electrode pair (322*ba* and 322*bb*) has four other electrodes in close proximity, whereas the former electrode pair (322*aa* and 322*bb*) has only two other electrodes in close proximity. In general, the specific resistance between a pair of outer electrodes disposed at a given distance from one another will differ from the specific resistance between a pair of electrodes disposed at the same distance from one another which pair includes one or more inner electrodes. This effect is greater in a compact array with relatively small distances between electrodes. One measure of compactness is the mean distance between neighboring electrodes. For example the mean distance may be less than five times the mean diameter of the individual electrodes, more desirably less than 3 times the mean diameter of the individual electrodes, and still more desirably less than 2 times the mean diameter of the individual electrodes.

Figure 6:
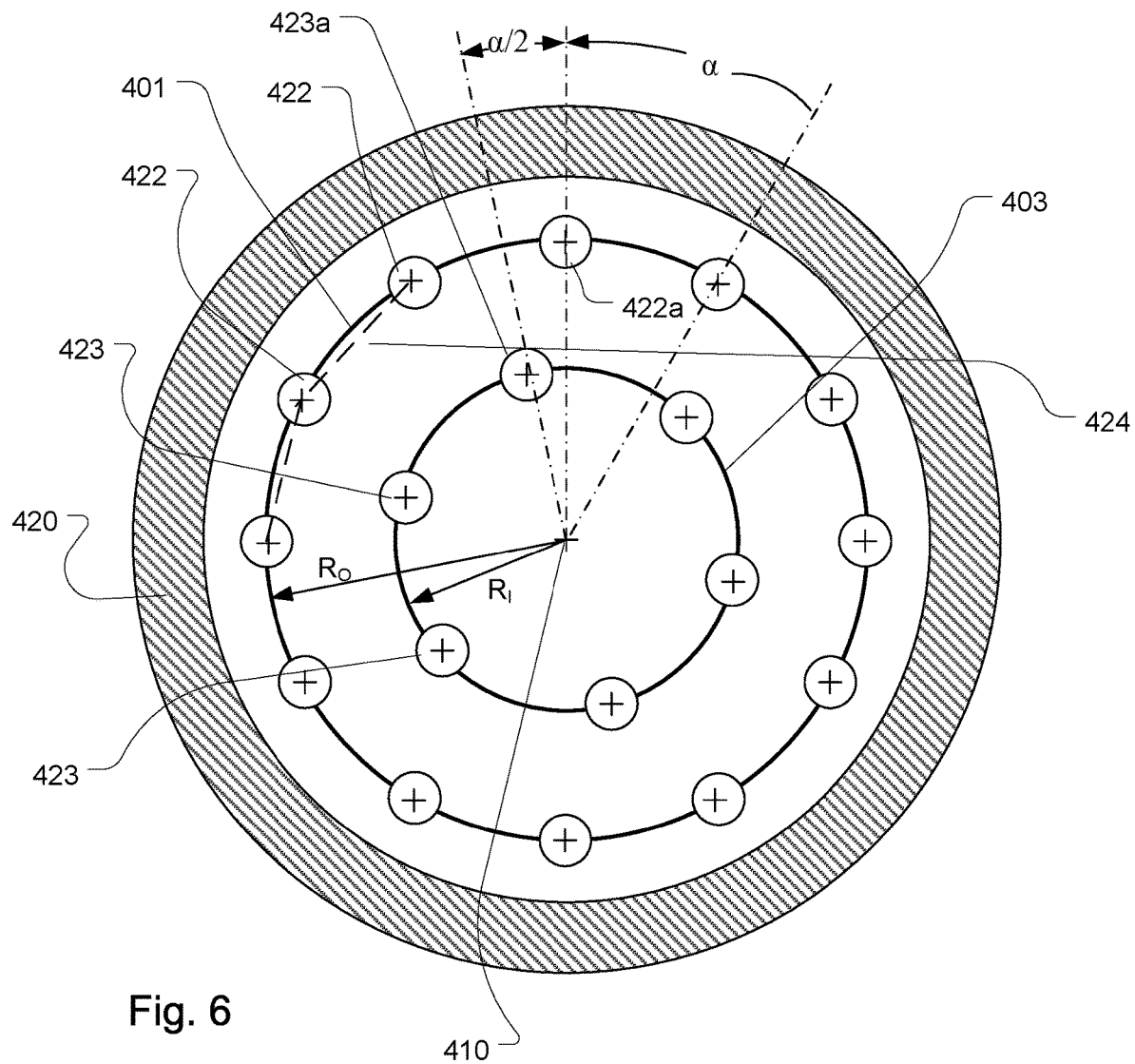
FIG. 6 is a diagrammatic sectional view of a heater according to yet another embodiment of the invention.

A heater according to a further embodiment of the invention (FIG. 6) includes a housing 420 and an array of rod-like electrodes 422 having outer electrodes disposed at locations on an outer circle 401 having a radius $R_O$ around a central axis 410. Although circle 410 is shown in solid line for clarity of illustration, it is a locus of the electrodes, not a physical structure. Twelve outer electrodes are provided, and these are spaced at regular circumferential intervals $\alpha$, where $\alpha=30°$. The outer electrodes thus define the boundary of the array as a regular 12-sided polygon 424, only a portion of which is depicted in FIG. 6. The array further includes six inner rod-like electrodes 423 disposed at regular circumferential intervals of $2\alpha$ on an inner circle 403, concentric with the outer circle and with central axis 410. The radius $R_I$ of the inner circle is smaller than $R_O$. A first one 423*a* of the inner electrodes is offset in the circumferential direction around central axis 410 from a first one 422*a* of the outer electrodes by $\alpha/2$ degrees. Thus, every other one of the inner electrodes 423 also lies at a circumferential location midway between the circumferential locations of the two closest outer electrodes. All of the electrodes extend parallel to one another and parallel to the central axis 410. In this embodiment as well, each of the electrodes can be connected to either pole of the power supply, or left disconnected from the power supply. Where a shunting bus is provided, electrodes which are disconnected from the power supply can be connected to the shunting bus. Here again, although this array of electrodes has some degree of regularity, it provides a substantial number of unique specific resistances between various combinations of electrodes. In a variant of this arrangement, the circumferential spacings between inner electrodes 423, the circumferential spacings between outer electrodes 442, or both may be wholly or partially irregular. In a further variant, further electrodes may be added within the array, and those electrodes may be disposed at locations on further circles. In yet another variant, the inner electrodes may be disposed on an inner circle which is not concentric with the outer circle.

Figure 7:
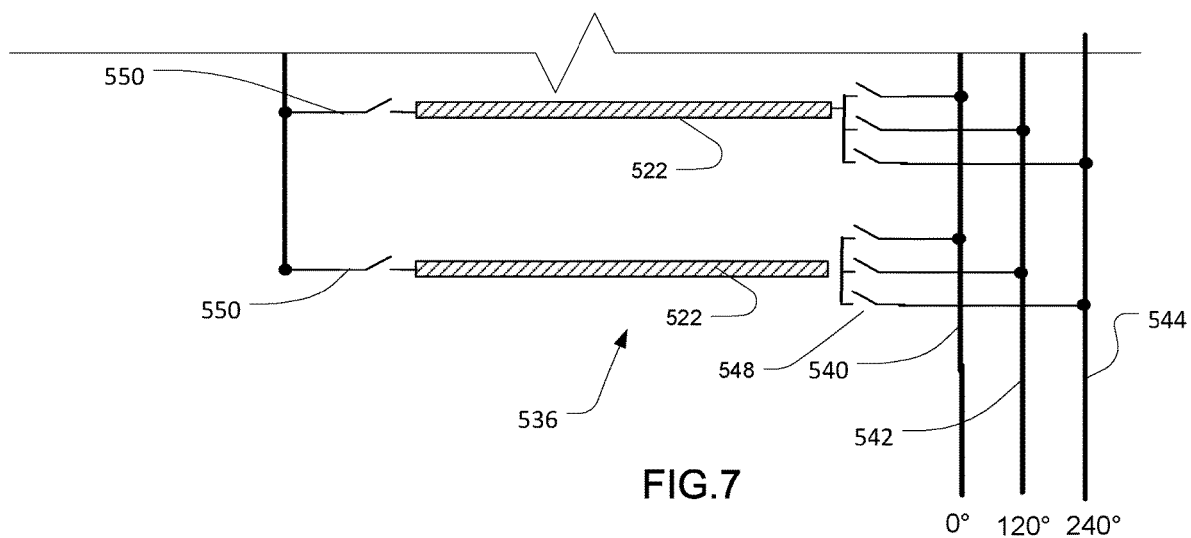
FIG. 7 is a schematic view of an electrical circuit in another embodiment of the invention.

Three-phase electrical power is commonly used to power large-scale industrial and commercial electrical equipment which consumes power on the order of a kilowatt or more. A power supply 536 for use with three-phase power includes three poles 540, 542 and 546 which are connectable to a three-phase utility circuit (not shown) to receive alternating potentials of equal magnitude offset by 120° in phase from one another, i.e., at phase angles of 0°, 120°, and 240°. Here again, power switches 548 are provided for selectively connecting each of the electrodes to one of the poles. Only two of the electrodes 522 are depicted in FIG. 7 for clarity of illustration; the same arrangement of power switches 548 typically is provided for every one of the electrodes. The power switches depicted as including three switches associated with each electrode, so that any electrode can be connected to any pole. However, in many cases, it is unnecessary to include all of these switches. For example, the power switches may include only a single switch for each electrode, so that a given electrode may be connected to one of the poles or left disconnected. In this case, the power switches associated with different electrodes are arranged to connect different ones of the electrodes to different poles. Optionally, one or more shunting busses 552 and shunting switches 550 also may be provided. In three-phase operation, current flows through the electrodes and through current paths in the fluid between each pair of poles, i.e., between poles 540 and 542; between pole 540 and 544; and between poles 542 and 544. In operation of three-phase power supply as shown in FIG. 7, it is highly desirable to maintain these three current flows equal to one another. Stated another way, the electrical resistances between each pair of poles desirably is equal to the electrical resistance between each other pair of poles. Assuming that the electrical resistivity of the fluid in contact with the electrodes is the same along each current path in the fluid, the specific resistance between each pair of poles should be equal.

Figure 8:
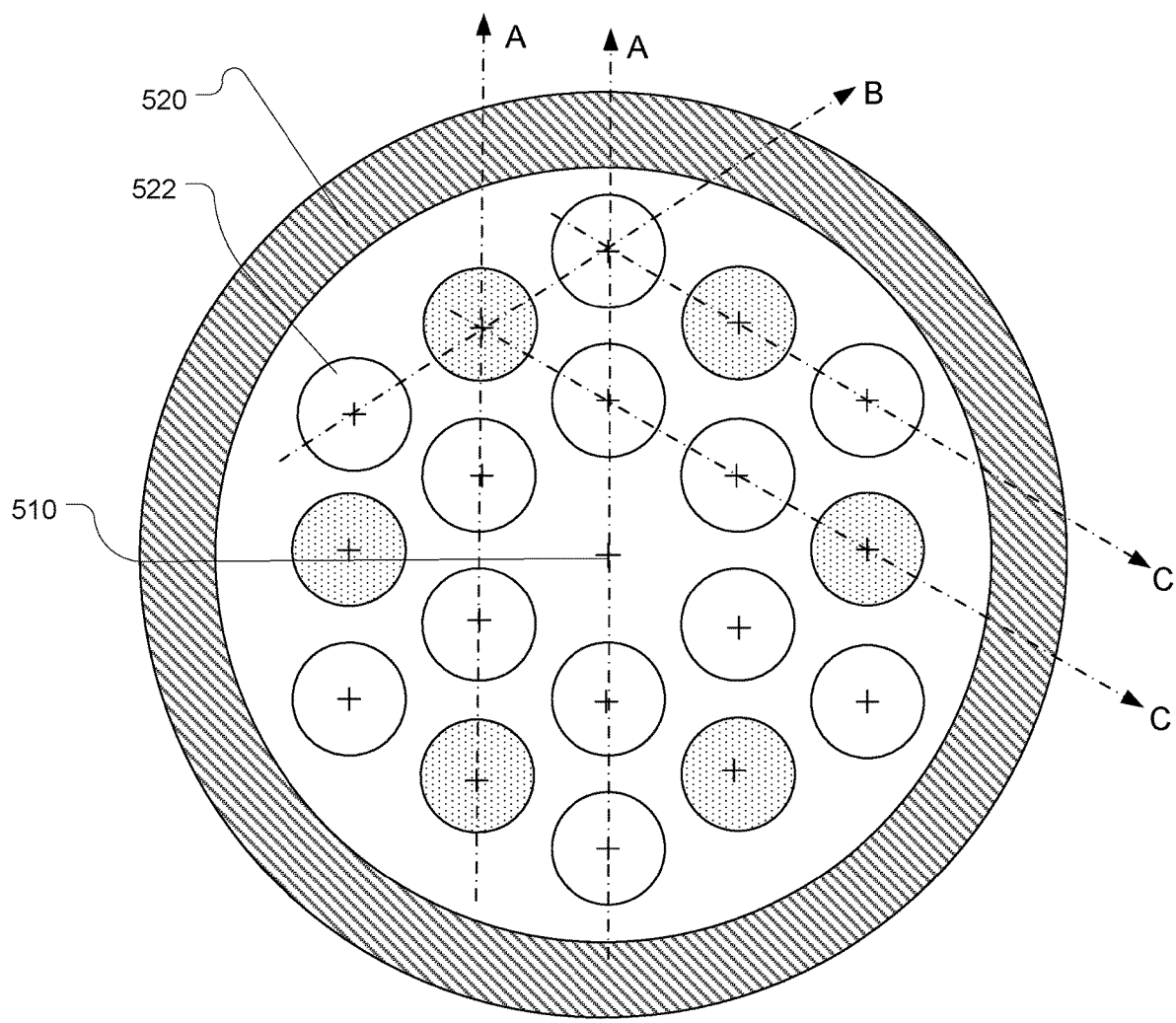
FIG. 8 is a diagrammatic sectional view depicting a heater used with the electrical circuit of FIG. 7.

One heater used which can be used with the power supply of FIG. 7 is shown in FIG. 8. The heater includes electrodes 522 disposed in a dielectric housing 520. The electrodes desirably are arranged at locations of a hexagonal lattice as depicted in FIG. 8. Here again, all of the electrodes 522 are rod-like and extend parallel to one another, into and out of the plane of the drawing. In the hexagonal lattice, the electrodes are disposed in rows having row directions at angles of 60° from one another, with the centers of the electrodes in each row disposed on row axes (denoted A, B and C in FIG. 9) extending in the row directions. Although only a few row axes are depicted in FIG. 9 for clarity of illustration, there are similar row axes extending along the other rows of electrodes. The row axes parallel to one another are disposed at identical spacings from one another so as to define intersections at vertices of numerous equilateral triangles, and the axes of the array are disposed at least some of the vertices. Here again, the array includes outer electrodes which in this embodiment define an outer regular hexagon, and inner electrodes which define an inner hexagon. The row axes also define a central vertex 510. A central axis extends parallel to the axes of the electrodes through the central vertex, and the array has six-fold symmetry about the central axis.

The same array can also be described as an arrangement of electrodes disposed on concentric circles, where all of the electrodes disposed on the inner hexagon lie on an inner circle (not shown) of radius $R_I$ around the central vertex; the electrodes disposed at the corners of the outer hexagon lying on an outermost circle (not shown) of radius $R_O$ concentric with the inner circle and central vertex 510; and the electrodes on the sides of the outer hexagon, shown shaded in FIG. 9, are disposed on an intermediate circle (not shown) of radius $R_{INT}$ concentric with the inner and outer circles, where $R_I<R_{INT}<R_O$.

The power supply is arranged to connect at least some of the electrodes to the poles of the power supply in connection schemes such that the connected electrodes include three sets of electrodes connected to different ones of the poles 540, 542 and 544 of the power supply (FIG. 7). One such of connection scheme is depicted in FIG. 9, with the electrodes 522a of a first set, 522b of a second set and 522c of a third set shown with different cross-hatchings. In this particular scheme, all of the electrodes 522 of the array are connected to the poles to provide low specific resistances between the poles. In another pattern, (FIG. 10) each set of electrodes 522a, 522b, 522c includes only one electrode, and these electrodes are outer electrodes at the corners of the hexagonal array to provide very high specific resistance between the poles, and thus provide the minimum heating rate. In this pattern, the remaining electrodes are disconnected from the poles of the power supply. Numerous intermediate schemes to provide numerous different specific resistances between the poles can be formed; one such intermediate scheme is shown in FIG. 11. In each of the connection schemes discussed above, each connected electrode and the corresponding electrodes of the other two sets are disposed at vertices of an equilateral triangle having its center at the central axis of the array. For example, in FIG. 11 electrodes 522a1, 522b1 and 522c1 are disposed at the vertices of one equilateral triangle, whereas electrodes 522a2, 522b2 and 522c2 are disposed at the vertices of another equilateral triangle. Stated another way, in each of the connection schemes discussed above, the connected electrodes of each are disposed at locations of the connected electrodes of the other sets rotated 120° about the central axis 510 from the locations of another set. In these connection schemes, the electrode sets have three-fold symmetry about the central axis. These electrode sets thus provide substantially congruent current paths between all three pairs of poles of the power supply, and the effects of neighboring electrodes on the current paths will be identical. These connection schemes therefore provide substantially equal specific resistances between the poles. In other connection schemes, such as that depicted in FIG. 12, the connected electrodes 522a, 522b and 522c are disposed at vertices of an equilateral triangle which is not centered at central axis 512. The conduction paths are of equal lengths and will have equal specific resistances apart from any differences which may be caused by differences in the effects of neighboring electrodes.

Although it is desirable to provide equal specific resistances between the poles, perfect equality is not required. Thus, the connection schemes can include one or more electrodes connected to one or two of the poles in such a way as to cause inequality. However, it is desirable to select the electrodes so that at least a substantial part of the current, and desirably at least a majority of the current, flows through current paths having equal specific resistances. This can provide additional heating rates different from those achievable with perfect equality, while introducing only a limited amount of imbalance in the currents of the different phases. In a variant of this scheme, electrodes which cause unequal current flows can be connected cyclically. In each cycle, an electrode which causes unequal current flows with a greatest current through one pole is connected for a period and then disconnected and replaced by a second electrode which causes a corresponding unequal flow with a maximum current directed through a second pole, and the second electrode is then disconnected and replaced by a third electrode which causes a corresponding unequal current flow with the maximum current through the third pole. The third electrode is disconnected and replaced by the first electrode at the beginning of the next cycle. In this manner, the unequal current flows rotate among the poles, which distribute the effects of the excess current among the phases.

Arrays other than the regular hexagonal array can provide current paths with the three-fold symmetry discussed above. For example, the array of electrodes shown in FIG. 13 includes three groups of electrodes 622a, 622b and 622c. The electrodes within each group are shown with the same shading. The electrodes within each group are disposed at irregular radii from a central axis 610, and at irregular intervals in the circumferential direction around the axis. However, the groups are congruent with one another but each group is rotated 120° from the position of another group. The power supply is arranged to connect sets of electrodes so that the connected electrodes include corresponding electrodes from all three groups. Here again, the array has three-fold symmetry about the central axis, and thus the electrodes lie on vertices of equilateral triangles having centers at the central axis 610.

Where shunting busses are used with an array having three-fold symmetry about an axis, three shunting busses may be used so that the set of electrodes connected to one another by each bus each bus is congruent with the set of electrodes connected by another bus, but is rotated 120° from the position of such other set.

In the discussion above, it is assumed that the liquid passing through the heater has uniform resistivity. However, the resistivity of most liquids varies with the temperature of the liquid. Where the flow of liquid is predominantly parallel to the axes of the electrodes, this effect tends to affect all of the current paths equally. If the hotter liquid has lower resistivity, that portion of each current path nearer the downstream ends of the electrodes will carry a greater current than the portion of the same path nearer the upstream ends, but the relationship between the currents carried by the various paths will be unaffected. However, if the electrodes and the direction of fluid flow extend horizontally, convection may cause hotter liquid to flow preferentially through those current paths disposed near the top of the array. Where the array is connected to a three-phase power source, this may lead to asymmetric current flows between the poles. To suppress this effect, vanes (not shown) may be provided within the housing to induce rotational flow around the axis of the housing, so that the liquid follows a generally helical path. The same effect may be achieved by configuring the inlet, outlet or both so that the flow of fluid into housing, out of the housing or both will induce rotational flow around the axis of the housing.

In each of the embodiments discussed above, the rod-like electrodes are in the form of right circular cylinders. However, other elongated rod-like elements may be employed. For example, the rod-like elements may by tapered. In still other arrangements, the rod-like electrodes may have non-circular cross-sectional shapes in the regions of the electrodes which are exposed to the liquid. These electrodes may be generally cylindrical or conical to provide a circular cross-sectional shape in the regions of the electrodes which penetrate the walls of the housing.

In the embodiments discussed above, the electrodes are of equal diameter. However, the diameters of the electrodes may be unequal. Also, the lattice arrangement as depicted in FIG. 8 has all of the electrodes disposed at equal spacings. This arrangement may be varied somewhat. For example, the diameter of the intermediate circle may be increased slightly to move the electrodes on the intermediate circle away from the central axis. In this instance, the smaller triangular sets of three connected electrodes as depicted in FIG. 12 will not have equal distances between the connected electrodes, and therefore may induce some phase inequality, but there will be additional unique specific resistances. The array of FIG. 8 is just one example of an array where the entire array has N-fold symmetry about a central axis where N is 3 or a multiple of 3. Moreover, the array of FIG. 8 includes subgroups of electrodes having N-fold symmetry about other axes. Other arrays having either or both of these properties can be used to provide three-phase balance.

In all of the arrangements discussed above, the number of electrodes can be varied as needed.

As these and other variations and combinations of the features discussed above can be employed, the foregoing description should be taken by way of illustration, rather than as limiting the invention.

The invention claimed is:

1. A liquid heater comprising:
   (a) a chamber configured to receive a liquid passing therethrough along a flow direction between an inlet and an outlet;
   (b) a plurality of rod-like electrodes disposed within the chamber and extending substantially parallel to one another along a direction transverse to the flow direction, the electrodes being spaced apart from one another in an irregular two-dimensional array wherein, for at least some of the electrodes, distances between a given one of the electrodes and two other ones of the electrodes which are closest to the given one of the electrodes are unequal;
   (c) a three-phase electrical power supply having three poles, the power supply being operable to supply alternating potentials offset by 120° in phase to the respective poles;
   (d) power switches electrically connected between at least some of the electrodes and the poles, the power switches being operable to selectively connect each of the electrodes to one the poles and to selectively disconnect each of the electrodes from the poles so as to form current paths between electrodes connected to different ones of the poles through the liquid disposed in the chamber; and
   (e) a control processing unit coupled to the power switches and configured to actuate the power switches according to switch setting data retrieved from a memory, the memory storing a plurality of predefined connection schemes;
   wherein the connection schemes include electrode groupings having three-fold symmetry about a central axis and define current paths between pairs of poles of the three-phase power supply with substantially equal specific resistance.

2. A liquid heater comprising:
   (a) a chamber configured to receive a liquid passing therethrough along a flow direction between an inlet and an outlet;
   (b) a plurality of rod-like electrodes disposed within the chamber and extending substantially parallel to one another along a direction transverse to the flow direction, the electrodes being disposed a two-dimensional array including outer electrodes cooperatively defining an outer boundary of the array and inner electrodes disposed within the boundary;
   (c) a three-phase electrical power supply having three poles, the power supply being operable to supply alternating potentials offset by 120° in phase to the respective poles;
   (d) power switches electrically connected between at least some of the plurality of electrodes and the poles, the power switches being operable to selectively connect each of the electrodes to one or another of the poles and to selectively disconnect each of the electrodes from the poles so as to form current paths extending through the liquid disposed in the chamber between electrodes connected to different ones of the poles; and
   (e) a control processing unit coupled to the power switches and configured to actuate the power switches according to switch setting data retrieved from a memory, the memory storing a plurality of predefined connection schemes;
   wherein the connection schemes include electrode groupings having three-fold symmetry about a central axis and define current paths between pairs of poles of the three-phase power supply with substantially equal specific resistance.

3. The heater as claimed in claim 2 wherein the array includes a plurality of rows of electrodes extending in a first direction with the electrodes within each row spaced apart from one another in the first direction and aligned with one another in a second direction orthogonal to the first direction, the rows being spaced apart from one another in the second direction.

4. The heater as claimed in claim 3 wherein the electrodes within at least one of the rows are disposed at unequal intervals in the first direction.

5. The heater as claimed in claim 4 wherein the electrodes are disposed in columns extending in the second direction, the electrodes disposed in each column being aligned with one another in the second direction, the columns being spaced apart from one another at unequal intervals in the first direction.

6. The heater as claimed in claim 2 wherein the outer electrodes are disposed along an outer circle around a central axis and extend parallel to the central axis.

7. The heater as claimed in claim 6 wherein the inner electrodes are disposed along one or more inner circles coaxial with the outer circle.

8. The heater as claimed in claim 6 wherein the inner electrodes are disposed along a single inner circle coaxial with the outer circle.

9. The heater as claimed in claim 8 wherein M inner electrodes are disposed along the single inner circle and N outer electrodes are disposed along the single outer circle, and N>M.

10. The heater as claimed in claim 9 wherein the outer electrodes are disposed at equal circumferential spacings and the inner electrodes are disposed at equal circumferential spacings.

11. The heater as claimed in claim 10 wherein N=2M, and wherein each inner electrode is disposed at a circumferential location midway between the circumferential locations of two of the outer electrodes.

12. The heater as claimed in claim 7 wherein the inner electrodes include intermediate electrodes disposed on an intermediate circle of smaller diameter than the outer circle and innermost electrodes disposed on an inner circle of smaller diameter than the intermediate circle.

13. The heater as claimed in claim 2 wherein the array includes three groups of electrodes having N-fold symmetry about a central axis, and wherein the power supply is a three-phase power supply having three poles, the power switches being operable to select sets of connected electrodes so that the connected electrodes includes corresponding electrodes from each group so that the connected electrodes define current paths having three-fold symmetry about the central axis.

14. The heater as claimed in claim 13 wherein N is 3 or a multiple of 3.

15. The heater as claimed in claim 14 wherein the electrodes of each group are disposed at irregular radii from the central axis, and at irregular intervals in the circumferential direction around the axis.

16. The heater as claimed in claim 14 wherein the power switches are operable to select the three sets of connected electrodes so that the connected electrodes provide current paths having equal current flows between the poles of the power supply, and so that the connected electrodes include other electrodes which provide current paths having unequal current flows between the poles of the power supply, and so that the paths of equal current flow carry at least the majority of the current flowing between the poles.

17. A liquid heater comprising:
(a) a chamber;
(b) a plurality of rod-like electrodes disposed within the chamber and extending substantially parallel to one another, the electrodes being disposed a two-dimensional array;
(c) a three-phase electrical power supply having three poles, the power supply being operable to supply different electrical potentials to different ones of the poles;
(d) power switches electrically connected between at least some of the plurality of electrodes and the poles, the power switches being operable to selectively connect each of the electrodes to one or another of the poles and to selectively disconnect each of the electrodes from the poles so as to form current paths extending through liquid disposed in the chamber between electrodes connected to different ones of the poles and
(e) a control processing unit coupled to the power switches and configured to actuate the power switches based on switch setting data retrieved from a memory, the memory storing a plurality of predefined connection schemes, wherein the connection schemes include groupings of electrodes defining current paths having three-fold symmetry about a central axis and substantially equal specific resistances between the poles of the three-phase power supply;

wherein the electrodes are arranged in a hexagonal array including outer electrodes cooperatively defining an outer boundary of the array in the shape of a regular hexagon and inner electrodes disposed within the boundary and defining at least one inner hexagon, the array including rows extending along three sets of row axes disposed at 60° angles to one another, the row axes in each set being uniformly spaced and the spacings between row axes of the three sets being equal to one another, the row axes intersecting one another to form a grid of equilateral triangles, the electrodes being disposed at the vertices of the equilateral triangles, the power switches being operable to connect three sets of the electrodes to the respective poles so that the electrodes connected to the poles have three-fold symmetry around a central axis and define current paths between the poles having three-fold symmetry around the central axis.

* * * * *